United States Patent [19]

Martin

[11] Patent Number: 4,622,441
[45] Date of Patent: Nov. 11, 1986

[54] TWO-WIRE/FOUR WIRE COMMUNICATION INTERFACE WITH NOISE REJECTION

[75] Inventor: Philip T. Martin, Raleigh, N.C.

[73] Assignee: ITT Corporation, New York, N.Y.

[21] Appl. No.: 623,267

[22] Filed: Jun. 21, 1984

[51] Int. Cl.[4] ............................................. H04B 1/58
[52] U.S. Cl. .................................. 379/345; 379/348; 379/402
[58] Field of Search ....... 179/18 FA, 70, 77, 170 NC, 179/170 T; 370/28

[56] References Cited

U.S. PATENT DOCUMENTS

| | | | |
|---|---|---|---|
| 4,317,963 | 3/1982 | Chea, Jr. ............................ | 179/77 |
| 4,388,500 | 6/1983 | Regan ............................ | 179/170 T |
| 4,433,213 | 2/1984 | Albers et al. .................. | 179/18 FA |
| 4,514,595 | 4/1985 | Rosenbaum et al. ................. | 179/70 |
| 4,532,381 | 7/1985 | Rosenbaum et al. .......... | 179/18 FA |
| 4,539,438 | 9/1985 | Rosenbaum et al. .......... | 179/18 FA |

OTHER PUBLICATIONS

J. Ayres; "One Peril of the Digital Age"; *Telephony*; Nov. 17, 1980; pp. 48–50.

*Primary Examiner*—Gene Z. Rubinson
*Assistant Examiner*—Randall P. Myers
*Attorney, Agent, or Firm*—John T. O'Halloran; Jeffrey P. Morris

[57] ABSTRACT

A subscriber line interface circuit is provided for a telephone system for interconnecting a two-wire telephone channel with a four-wire telephone channel. The circuit includes a pair of power amplifiers employing complementary circuitry and being coupled in complementary fashion to the two-wire channel so as to provide for both DC electrical excitation to the two-wire channel, as well as providing for an impedance match over the voice frequency spectrum, thereby reducing power dissipation while improving the coupling of voice and/or data signals. The presence of any noise on power line is rejected by use of transistor biasing circuits and by use of feedback circuitry. Both resistive and capacitive feedback branches are provided for the impedance matching.

17 Claims, 5 Drawing Figures

TWO-WIRE/FOUR WIRE COMMUNICATION INTERFACE WITH NOISE REJECTION

BACKGROUND OF THE INVENTION

This invention relates to interface circuitry for interconnecting a two-wire communication channel with a four-wire communication channel. More particularly, the invention is directed to a telephone subscriber line interface circuit (SLIC) of hybrid form which provides both direct-current power and telephonic signals to a subscriber line while rejecting noise from a source of the power.

In communication systems, particularly telephony, it is common practice to transmit signals between a subscriber station and a central switching office via a two-wire bidirectional communication channel. Between central offices, communication is implemented frequently by use of a four-wire communication channel comprising a pair of two-wire channels for communicating in opposite directions. An interface circuit, or SLIC, connects the two-wire channel with the four-wire channel. The SLIC directs the signal transmission between the two-wire bidirectional channel and the input and the output portions of the four-wire communication channel while inhibiting any coupling of incoming and outgoing communications between the corresponding portions of the four-wire communication channel. The function of inhibiting the coupling of the incoming and outgoing portions of the four-wire communication channel is known as a transhybrid balance function.

One form of interface circuit is taught in U.S. Pat. No. 4,041,252 issued in the name of Earl T. Cowden and assigned to the assignee of the present invention. The Cowden circuit and variations thereof have been widely and successfully utilized in the system 1210 electronic switching system manufactured and sold by International Telephone and Telegraph Corporation. The Cowden circuit includes provisions for the injection of direct current into the subscriber line from a battery or other source of power, and also provides for the injection of voice signals into the two-wire subscriber line as well as reception of voice signals therefrom.

A further interface circuit is disclosed in a co-pending U.S. patent application entitled ELECTRONIC HYBRID HAVING SYNTHESIZED IMPEDANCE CIRCUITRY, filed in the name of Philip T. Martin on Dec. 22, 1983 and having Ser. No. 564,637, now U.S. Pat. No. 4,567,331. Both the Cowden and Martin circuits employ feedback circuitry and resistive feed of direct current into each wire of the subscriber channel. The feedback circuitry of the Martin circuit is more extensive than that of the Cowden circuit and provides for a synthesized impedance which is presented to the subscriber channel. With respect to the resistive connections, the subscriber line may be characterized by a termination impedance of 900 ohms AC (alternating current) in which case each of the feed resistors would have a value of 450 ohms for a matching of the impedance.

In the foregoing Martin circuit, the use of feedback to synthesize the desired impedance presented to the subscriber line results in a lowered value of resistance to the feed resistors and, hence, a reduction in power dissipated in the interface circuit.

In view of the connection of the interface circuit between a source of power and the subscriber line, there is the danger than any noise which may be present on the power lines may be coupled through the interface circuit to the subscriber line. The presence of such noise on the subscriber line is undesirable, particularly in that it may degrade the quality of voice signals and other communication carried by the subscriber line.

SUMMARY OF THE INVENTION

The foregoing problem is overcome and other advantages are provided by a subscriber line interface circuit (SLIC) which connects a two-wire subscriber line to both a source of power and to a four-wire communication channel and wherein, in accordance with the invention, the SLIC incorporates circuitry for the rejection of noise which may be present at the power supply or the supply lines connecting power to the interface circuit.

The interface circuit comprises two power amplifiers arranged symmetrically about the subscriber line and coupled thereto by feed resistors. An outgoing signal of the subscriber line is coupled via an amplifier to the outgoing portion of the four-wire communication channel. An incoming signal of the four-wire communication channel is applied to both of the power amplifiers for symmetrical feed of the incoming signal to the subscriber line. In addition, the incoming signal of the four-wire communication path is coupled via a transhybrid balance circuit to the outgoing portion of the four-wire communication channel to cancel any of the signals which may be reflected back out via the power amplifiers.

In accordance with the invention, each power amplifier incorporates an operational amplifier having a pair of differential input terminals, one of which is used for a feedback circuit. A reference signal for the feedback circut is attained by use of complementary transistors which, in turn, are biased for their operating points by resistor circuits. The complementary transistors are connected between opposite poles of the power supply, as are the resistor circuits which bias the transistors. A feedback resistor coupled to the feedback terminal is presented, thereby, with a high impedance, and with a voltage which, by symmetry, is essentially free of of power supply noise. Also provided is a capacitive feedback path which connects with one of the foregoing transistors. Any noise coupled thereto is substantially reduced by action of the feedback loop. The other input terminal of the operational amplifier connects with the incoming portion of the four-wire communication channel. The connection with the incoming portion of the four-wire communication channel includes a capacitor which incrementally grounds out any noise which may be picked up at the signal input terminal of the operational amplifier.

Thereby, the invention provides for the substantial rejection of noise from the power supply while permitting the coupling of both AC (alternating current) and DC (direct current) to the subscriber line. In one embodiment of the invention a DC feedback path is provided by a resistor, while in an alternative embodiment of the invention, a more complex impedance element is employed in the DC feedback path to more accurately match the impedance presented by the interface circuit to that of the subscriber line.

BRIEF DESCRIPTION OF THE DRAWING

The foregoing aspects and other features of the invention are explained in the following description taken in connection with the accompanying drawing wherein.

DETAILED DESCRIPTION

Figure 1A:
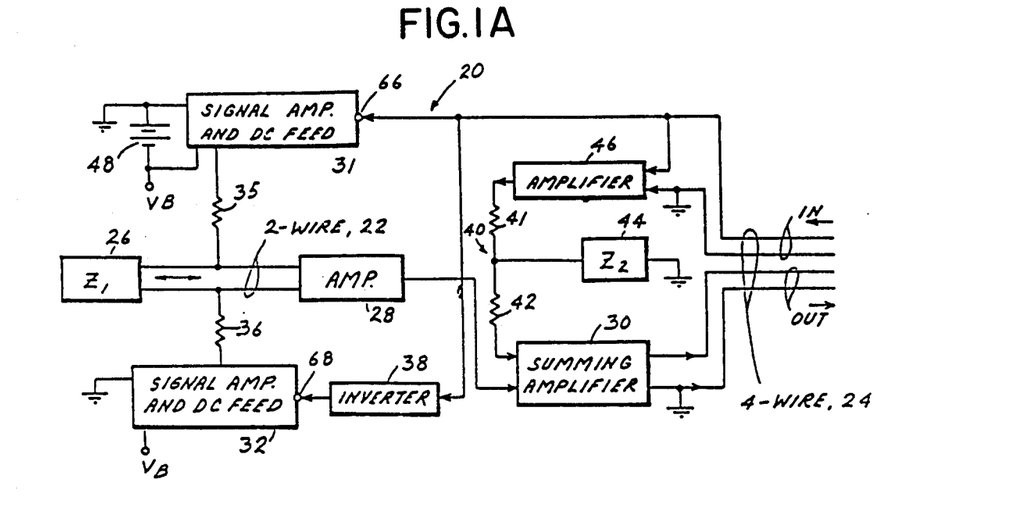
FIG. 1 is a simplified schematic diagram of an interface circuit incorporating the invention.

In FIG. 1 there is shown an interface circuit 20 incorporating the invention. The circuit 20 connects a two-wire transmission line channel 22 with a four-wire channel 24. In a typical situation, the interface circuit 20 would be used in a telephone system at a central office for making the interconnection between the two-wire channel 22 and the four-wire channel 24. The two-wire channel 22 connects with a subscriber telephone (not shown). The two-wire channel 22 functions as a transmission line and has, accordingly, a characteristic impedance represented by impedance element 26, the value of the impedance being $Z_1$. The impedance of the telephone is presumed to be matched to that of the transmission line so that the impedance element 26 does properly represent the impedance presented to the interface circuit 20 by the two-wire transmission-line channel 22.

The four-wire channel 24 is composed of an incoming portion and an outgoing portion, each of which comprises two wires. In both the incoming portion and the outgoing portion, one of the two-wires is grounded. A signal arriving at the interface circuit via the incoming portion is coupled via the circuit 20 to the two-wire channel 22 for subsequent transmission to the subscriber telephone. A signal propagating along the two-wire channel 22 from the subscriber telephone is coupled via the circuit 20 to the outgoing portion of the four-wire channel 24.

The interface circuit 20 comprises a preamplifier 28 and a summing amplifier 30 serially connected for coupling a signal from the two-wire channel 22 to the outgoing portion of the fourwire channel 24. The amplifiers 28 and 30 amplify the signal of the two-wire channel 22 to a sufficient amplitude for transmission along the outgoing portion of the four-wire channel 24.

The interface circuit 20 further comprises a pair of power amplifiers 31-32 which are coupled, respectively, by resistors 35-36 to individual wires of the two-wire transmission-line channel 22. The incoming portion of the four-wire channel connects directly to the power amplifier, 31 and connects via an inverter 38 to the power amplifier 32. The inverter 38 comprises a well-known operational amplifier having unity gain for inverting the sense of the analog signal carried by the incoming portion of four-wire channel 24. By splitting the incoming signal between the two amplifiers 31-32, the interface circuit 20 provides for a balanced feed of an incoming voice signal, or other form of data signal via the resistors 35-36 to the wires of the two-wire channel 22.

The interface circuit 20 further comprises a transhybrid balance network 40 having two resistors 41-42 connected in series wih an impedance element 44 connected between the junction of the resistors 41-42 and ground. The resistor 41 is connected by an isolation amplifier 46 to the incoming portion of the four-wire channel 24, and the resistor 42 is connected by the summing amplifier 30 to the outgoing portion of the four-wire channel 24. The amplifier 30 sums together the signals applied to its input terminals by the preamplifier 28 and the resistor 42. The isolation amplifier 46, which may have unity gain, provides for a low impedance drive of the balance network 40. A battery 48 is provided for supplying electric power to the two-wire channel 22 via the power amplifiers 31-32 and the feed resistors 35-36. As will be seen in the ensuing description of the invention, to be presented with respect to FIG. 2, both of the amplifiers 31-32 serve as voltage sources having essentially zero output impedance for driving direct current (DC) into the two-wire transmission line channel 22, thereby to serve as the source of power for the subscriber telephone. In addition, the voice signal is also applied to the channel 22 by the amplifiers 31-32 at a suitable output impedance to match the impedance of the channel 22 at the voice frequency band.

In operation, an outgoing voice signal, or other form of data signal, emanating from the subscriber telephone is amplified and coupled via the amplifiers 28 and 30 from the channel 22 to appear on the outgoing portion of the channel 24. An incoming voice signal, carried by the incoming portion of the channel 24, is split between the power amplifiers 31-32 and the balance network 40. The ampliers 31-32 then apply this incoming signal to the channel 22 with the result that the incoming signal propagates both to the subscriber telephone as well as to the amplifier 28. In order to prevent the incoming signal from being coupled via the amplifier 28 back out through the outgoing portion of the channel 24, the portion of the incoming signal at the amplifier 28 is cancelled at the summing amplifier 30 by the portion of the incoming signal presented by the balance network 40 to the summing amplifier 30. The cancellation occurs by a subtraction of the two signals appearing at the input terminals of the amplifier 30. The subtraction may be accomplished, by way of example, by operating the amplifier 28 as an inverting amplifier or, alternatively, by coupling the two input signals to inverting and non-inverting input terminals of the amplifier 30. As is described in the foregoing Cowden patent, and the foregoing application of Martin, the impedance $Z_2$ of the element 44 is selected to provide a match to the waveform of the portion of the incoming signal at the output terminal of the amplifier 28, thereby to attain the desired cancellation. Thus, only an outgoing signal produced by the subscriber telephone appears on the outgoing portion of the four-wire channel 24.

Figure 2:
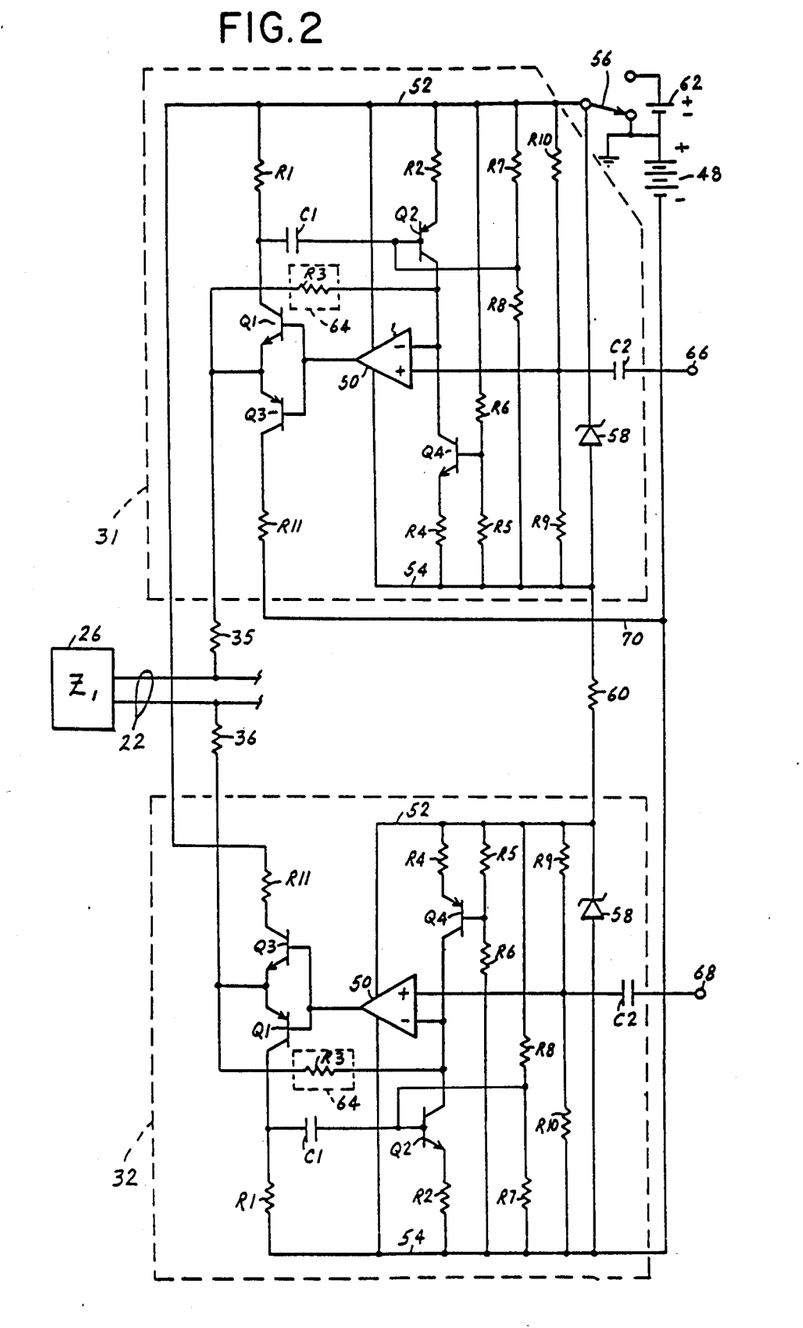
FIG. 2 is a schematic diagram of a pair of power amplifiers of FIG. 1 in accordance with the invention.

With reference also in FIG. 2, there is shown an electrical schematic diagram of the power amplifiers 31-32 of FIG. 1 and their interconnections with each other and with the two-wire channel 22. The two amplifiers 31-32 have the same configuration, except for the connection of components in the output stages, which components are connected in complementary fashion as will be described hereinafter. Each of the power amplifiers 31-32 comprises an operational amplifier 50 which is powered with voltage supplied between a positive supply line 52 and a negative supply line 54. The supply lines 52 and 54 are energized via a switch 56 connecting with the positive terminal of the battery 48, the positive terminal being grounded. The zener diode 58 in the amplifier 31 and a corresponding zener diode 58 in the amplifier 32 are serially connected by a resistor 60 between the positive and the negative terminals of the battery 48. Battery current flows through the switch 56 and via the diodes 58 and the resistor 60 to establish predetermined zener voltages across the diodes 58. In each of the amplifiers 31-32, the supply lines 52 and 54 are connected across the terminals of the zener diode 58, thereby to regulate the voltage between the lines 52 and 54 to be equal to that of the zener voltage. If desired, the switch 56 may be operated to an alternate position to insert a boost voltage of a battery 62 in series with the voltage of the battery 48, so as to provide additional voltage to the two-wire channel 22 as will be described hereinafter. However, in either position of the switch 56, the voltage across the lines 52 and 54 is constrained to equal that of the zener voltage of the diodes 58. The additional voltage drop associated with the battery 62 appears across the resistor 60.

Each of the power amplifiers 31-32 comprises an impedance element 64 connecting with the inverting input terminal of the amplifier 50 to serve as a feedback element. In the amplifier 31, the impedance element 64 connects with the feed resistor 35 while, in the amplifier 32, the impedance element 64 connects with the feed resistor 36. Each of the amplifiers 31-32 also comprises a further feedback element, namely, capacitor C1. A further capacitor C2 connects the noninverting input terminal of the amplifier 50 to input terminals 66 and 68, respectively, of the power amplifiers 31-32. Each of the amplifiers 31-32 further comprises eleven resistors R1-R11 and four transistors Q1-Q4. The amplifier 31 operates in the same fashion as does the amplifier 32 and, accordingly, only the operation of the amplifier 31 will be described in detail so as to facilitate the explanation of the invention. The operation of the amplifier 32 is complementary to that of the amplifier 31 and, accordingly, the corresponding elements of each of the two amplifiers 31 and 32 have been identified with the same legends to facilitate explanation of the invention.

The two transistors Q1 and Q3 are arranged in series with their respective emitter terminals being connected together. The transistor Q1 is type N-P-N, and the transistor Q3 is type P-N-P. The base terminals of the two transistors Q1 and Q3 are connected to the output terminal of the amplifier 50. The collector terminal of the transistor Q1 connects via resistor R1 to the power line 52 while the collector of the transistor Q3 is connected via resistor R11 and line 70 to the negative terminal of the battery 48. The two transistors Q1 and Q3 together form an output driver stage of the amplifier 31, and operate independently of the zener voltage of the diode 58 because the transistors Q1 and Q3 are connected directly via the resistors R1 and R11 to the terminals of the battery 48. In the event that the boost voltage of the battery 62 is also employed, then the combined battery voltage of the two batteries 48 and 62 is applied across the series arrangement of the transistors Q1 and Q3. The junction of the emitter terminals of the transistors Q1 and Q3 connects via the resistor 35 to a line of the two-wire channel 22. It is also noted that, with respect to the aforementioned feedback impedance element 64, the element 64 comprises the resistor R3 in this embodiment of the invention, but will be modified as element 64A in a further embodiment of the invention as will be described hereinafter with reference to FIGS. 3A-3B.

In accordance with a feature of the invention, which feature reduces the sensitivity of the amplifier 31 to the presence of noise on the power lines connecting with the battery 48, the transistors Q2 and Q4 are coupled in a series arrangement for establishing a DC bias voltage to the inverting input terinal of the amplifier 50. The collector terminals of the transistors Q2 and Q4 are connected together and to the junction of the resistor R3 with the inverting input terminal. The emitter terminals of the transistors Q2 and Q4 are connected by resistors R2 and R4, repectively, to the supply lines 52 and 54. Bias voltage and current for the transistor Q4 is applied to its base terminal by the series arrangement of resistors R6 and R5 connected, respectively, to the supply lines 52 and 54. Bias current and voltage for the transistor Q2 is applied to its base terminal by the series arrangement of resistors R7 and R8 coupled, respectively, between the supply lines 52 and 54. A DC bias voltage is applied to the noninverting input terminal of the amplifier 50 by the series arrangement of the resistors R10 and R9 coupled to the junction of the noninverting input terminal and the capacitor C2 and coupled furthermore, respectively, between the supply lines 52 and 54. The feedback capacitor C1 connects between the junction of the resistor R1 with the collector terminal of the transistor Q1 and the base terminal of the transistor Q2.

In operation, the rejection of the power supply noise may be understood as follows. The capacitor C2 may be regarded as incrementally grounded with respect to signals falling within the audio spectrum, this being the case in view of the connection of the capacitor C2 to the incoming signal line. Thereby, the noninverting input terminal of the amplifier 50 is isolated from noise on the power supply lines. With respect to the inverting input terminal of the amplifier 50, it is noted that the base and emitter voltages of the transistor Q2, and also of the transistor Q4, rise and fall together with any noise voltage which may be preset, respectively, on the supply line 52 and the supply line 54. Thereby, the emitter currents flowing in the resistors R2 and R4, respectively, remain essentially constant independently of the presence of any noise voltage on the power supply lines 52 and 54. Therefore, in view of the foregoing independency of the transistor currents, the bias voltage applied to the inverting input terminal of the amplifier 50 is isolated from the effects of the noise, except in so far as such noise may be coupled by the capacitor C1.

With respect to noise that may be coupled via the capacitor C1 from the collector terminal of the transistor Q1 to the base terminal of the transistor Q2, it is noted that the series arrangement of the transistors Q1, Q3, and the resistors R1, R11 between the supply lines 52 and 70 render the current passing through the resistors R1 and R11 susceptible to the effects of the noise. However, as will be explained subsequently, the feedback connection greatly reduces the effect of such noise so that the DC current fed by the resistor 35 may be regarded as being essentially free of the noise.

Figure 3A:
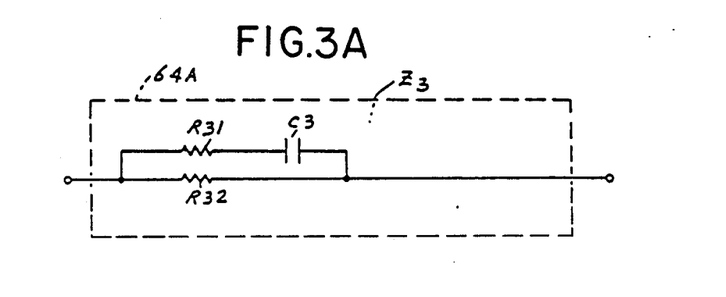
FIG. 3A is a schematic diagram of an alternative feedback element for each power amplifier of FIG. 2.
Figure 3B:
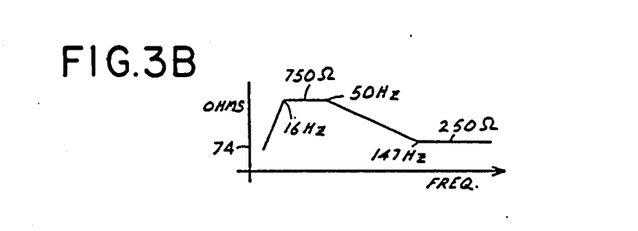
FIG. 3B is a graph of attenuation versus frequency for the circuit of FIG. 3A.

With reference also to FIGS. 3A-3B, it is noted that the basic features of the operation are the same for both embodiments of the feedback impedance element 64 and 64A. As shown in FIG. 3A, the impedance element 64A comprises two resistors R31 and R32 as well as capacitor C3. The capacitor C3 connects in a series arrangement with the resistor R31, the series arrangement being connected in parallel across the terminals of the resistor R32. The terminals of the resistor R32 are connected to the components of the amplifier 31, as well as to the components of the amplifier 32, in the same manner as is disclosed for the resistor R3 in FIG. 2. While the embodiment of the impedance element 64 enjoys simplicity of construction, the added components of the impedance element 64A provide for a better matching of the amplifiers 31 and 32 to the impedance of the two-wire channel 22 over both the DC supply current as well as over the audio spectrum.

Returning to the operation of the power amplifier 31, the collector terminals of the transistors Q2 and Q4 present a high impedance to the junction of the resistor R3 with the inverting input terminal of the amplifier 50. The collector impedance is substantially higher than the resistance of the resistor R3 with the result that there is essentially no current drain via the resistor R3, and essentially no corresponding voltage drop across the resistor R3. As a result, the voltage fed back to the inverting input terminal is essentially equal to that at the emitter terminal of the transistor Q1 so as to provide unity gain to the amplifier configuration comprising the amplifier 50 followed by the output stage of the complemented transistors Q1 and Q3.

This analysis assumes only a DC signal, so as to set aside the coupling effects of the capacitor C1. Accordingly, the foregoing analysis shows that the current fed via the resistor 35 to the two-wire channel 22 is precisely regulated by the power amplifier 31. In view of the series connection of the two power amplifiers 31-32 via the resistors 35 and 36 with the wires of the channel 22, the two power amplifiers 31-32 participate in the regulation of direct current through the wires of the channel 22, and also establish the desired operating voltage to the impedance element 26 of the channel 22. At DC, the foregoing feedback arrangement provides for essentially zero output impedance to each of the power amplifiers 31-32.

With respect to the operation of the power amplifier 31 at frequencies within the voice spectrum, it is noted that the impedance of the capacitor C1 is sufficiently low so that any AC voltage appearing across the resistor R1 may be considered as being applied directly to the base terminal of the transistor Q2. The resultant current flow via the capacitor C1 to the base terminal of the transistor Q2 results in a corresponding current flow through the emitter circuit of the transistor Q2; accordingly, the voltage drop across the resistor R2 follows that of the resistor R1. However, there is essentially no change in the amount of current flowing through the transistor Q4 in view of the aforementioned high collector impedance. Therefore, signal current flows through the resistor R3 and into the resistor 35 resulting in a diminution in the base-emitter voltage of the transistor Q1 and a corresponding decrease in the current drawn by the transistor Q1 through the resistor R1. Thereby, the connection of the capacitor C1 is in the nature of a negative feedback connection. The resultant incremental voltage change divided by an incremental current change at the resistor 35, this being the impedance of the output terminal of the amplifier 31, is given by R1R3/R2. This relationship is readily attained by noting that the output voltage $V_0$ is equal to $I_{C2}R3$ wherein $I_{C2}$ is the collector current of the transistor Q2 flowing through the resistor R3. By making the further substitution that $I_{C2}$ is given by $I_0R1/R2$, wherein $I_0$ is the current in R1, the foregoing value for the output impedance $Z_0 = V_0/I_0$ is obtained. For example, assuming R1=50 ohms, R3=100 kilohms, and R2=20 kilohms, then the output impedance is 250 ohms.

The feature of noise reduction is described further, now, with respect to the operation of the capacitor C1 and the resistor R1 in the feedback loop. The capacitance of C1 is sufficiently large to couple signals in the audio spectrum with no more than negligible AC impedance. Noise voltage within the audio spectrum developed across the resistor R1 in series with the collector resistance of Q1 is similarly coupled from the collector terminal of Q1 to the base terminal of Q2. For example, such noise may appear when the boost voltage of the battery 62 is employed because the supply line 52 is then no longer grounded. Typically, the resistance of R1 is set at approximately one percent of the collector resistance; thus, only one percent of the noise voltage (neglecting feedback) appears across the resistor R1. By considering also the foregoing factor of R3/R2=5 in the computation of the output impedance $Z_0$, the noise voltage is raised to 5% of the noise voltage appearing on the supply line 52.

The noise rejection is actually better than the foregoing 20:1 ratio. An increase in supply voltage due to noise would result in further current flow through the resistor R1 and the transistor Q1. The rising voltage is coupled via capacitor C1 to the transistor Q2 increasing the current therethrough and the voltage at the junction of the collector terminal of Q2 with the inverting input terminal of the amplifier 50. There results a decrease in voltage at the output terminal of amplifier 50 and a corresponding decrease in current in transistor Q1. Thus, the negative feedback tends to reduce any current changes in the transistor Q1 associated with power supply noise.

Figure 4:
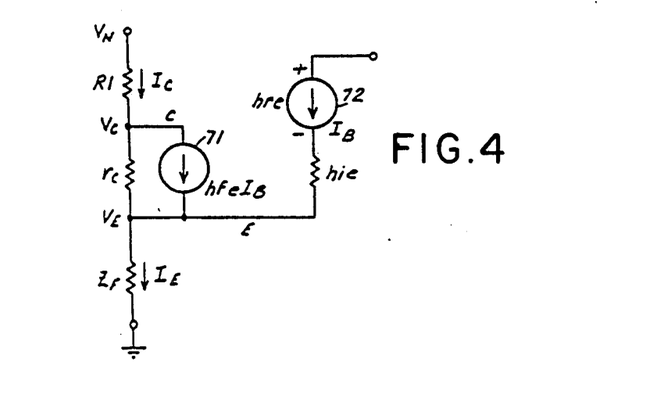
FIG. 4 is an equivalent circuit of an output transistor of the power amplifier, useful in calculation of noise rejection.

The amount of noise rejection can be estimated with the aid of the schematic diagram of FIG. 4 which is an equivalent circuit of the transistor Q1 and is useful in describing the operation of the transistor Q1. The symbology of FIG. 4 is as follows:

$V_N$ is the input noise voltage at the supply line;
$I_C$ is the collector current;
$V_C$ is the collector voltage;
$r_C$ is the collector resistance;
$V_E$ is the emitter voltage (referenced to ground);
$Z_F$ is the impedance, or load, in series with the emitter terminal of Q1 under the condition of zero current flow in transistor Q3;
$I_E$ is the emitter current;
$I_B$ is the base current;
B is the base terminal;
E is the emitter terminal;
C is the collector terminal;
hfe is the current gain for the common emitter configuration.
hre is the reverse voltage coefficient for the common emitter configuration;
hie is the base impedance for the common emitter configuration;
$V_B$ is the base voltage; and the circles 71-72 represent current and voltage sources respectively having the values indicated.

The circuit of the power amplifier 31 may now by analyzed further. The gain from the base terminal of the transistor Q2 to the emitter terminal of Q1, including the effect of feedback by the resistors R1, R2, and R3, is represented by the factor K. K=5 for the foregoing values of resistance. A negative sign is to be introduced into the expression for the gain due to the phase inversion associated with the inverting input of the amplifier 50. With respect to the circuits of FIGS. 2 and 4, the following relationships are obtained.

$$I_C = \frac{V_C - V_E}{r_C} + h_{fe}I_B \tag{1}$$

$$I_E = \frac{V_E}{Z_F} = I_C + I_B \tag{2}$$

$$V_c = V_n - I_c R_1 \tag{3}$$

By combining the foregoing three equations with each other and rearranging terms, the following equation is obtained.

$$I_C = \frac{V_N - V_E + r_C h_{fe} I_B}{r_C + R1} \tag{4}$$

Introducing $Z_F$ from Equation 2 and further rearrangement of terms provides $$I_C = \frac{(V_N - V_E)(h_{fe} + 1)}{(h_{fe} + 1)(R1 + r_C) - R1 h_{fe}} + \frac{r_C h_{fe}[V_E(Z_F^{-1} + r_C^{-1}) - V_N r_C^{-1}]}{(h_{fe} + 1)(R1 + r_C) - R1 h_{fe}} \tag{5}$$

A relationship for the gain is given by $$V_E = -K(V_N - V_C) = -KR_1 I_C \tag{6}$$

Substituting the expression for $I_C$ from Equation 5 into Equation 6 provides $$V_E = \frac{-V_N}{\left(\frac{1}{K} - 1\right) + \frac{r_C}{R1}\left[\frac{1}{K} + h_{fe}\left(\frac{1}{K} + \frac{R1}{Z_F}\right)\right]} \tag{7}$$

Further simplification produces the noise rejection ratio:

$$\frac{V_N}{V_E} = \left(\frac{r_C}{R1}\right)\left(\frac{h_{fe}}{K}\right) \tag{8}$$

wherein approximations have been made based on the foregoing element values and further in view of the parameter values, given by way of example, hfe=50 and $Z_F$=450 ohms. The noise rejection ratio is, thus, on the order of 60 dB (decibels).

In the construction of the circuit of FIG. 2, the following element values have been used. R2=R4=20 kilohms, R5=R7=360 kilohms, R6=R8=2.64 megohms, R9=R10=1.0 megohms, and the resistors 35 and 36 are each equal to 200 ohms.

The foregoing description of the noise rejection applies also in the use of power amplifiers 31-32 employing the alternative impedance element 64A instead of the impedance element 64. However, with the use of the alternative element 64A, a better match is made between the output impedance of the amplifiers 31-32 and the impedance of the two-wire channel 22. The two-wire channel impedance is characterized by both a resistive component and a series capacitance. The connection of the capacitor C3 with the resistors R31 and R32 in the element 64A provides an impedance Z3 which matches the resistive and capacitive components of the impedance of the channel 22. The operation of the impedance element 64A in the amplifier 31 is now explained.

In accordance with a further feature of the invention, the amplifier 31 with the element 64A provides a better impedance match to the channel 22 as may be understood from the following mathematics.

The parallel combination of the two resistors R31 and R32, at the higher frequencies wherein C3 is essentially an AC short circuit, should have a resistance on the order of 100 kilohms, so as to approximate the resistance of R3 in FIG. 2. Then, for a constant output voltage from the amplifier 50, applied as $V_B$ to the transistor Q1, the input impedance to Q1 is at its emitter relatively low, approximately 25 ohms, and substantially all of the load current $I_0$ flows through transistor Q1 and thus $I_0$ flows through the resistor R1 rather than through the parallel combination of R31 and R32. Hence, $$V_C = R_1 I_0 \tag{9}$$

Consider also the resistance of the parallel combination of the resistors R7 and R8, which combination resistance will be referred to hereinafter as R78 and appears in series between the supply lines 52, 54 and the capacitor C1. The contribution of R78 to the output impedance of the amplifier 31 has not been considered in the previous description because its contribution was small with respect to the effect of the impedance element 64. However, the contribution of R78 is more significant with the use of the alternative impedance element 64A and, accordingly, is considered in the following description.

The voltage at the base terminal of transistor Q2 is given by $$V_{Q2B} = V_C \frac{R78}{R78 + X_{C1}} \tag{10}$$

where $X_{C1}$ is the impedance of the capacitor C1. The current in the transistor Q2 is given by $$I_2 = \frac{V_{Q2B}}{R2} = \left(\frac{R1 I_0}{R2}\right)\left(\frac{R78}{R78 + X_{C1}}\right) \tag{11}$$

The voltage at the emitter $V_E$ of the transistor Q1 is given by $$V_E = Z_3 I_2 \tag{12}$$

The output impedance $Z_0$ is given, upon substitution for $I_2$ from Equation (11), by $$Z_0 = \frac{V_E}{I_0} = Z_3\left(\frac{R1}{R2}\right)\left(\frac{R78}{R78 + X_{C1}}\right) \tag{13}$$

The impedance $Z_3$ of the impedance element 64A is given by $$Z_3 = \frac{(R31 + X_{C3})R32}{R32 + R31 + X_{C3}} \tag{14}$$

Upon substituting $$X_{C_3} = \frac{1}{C_3 s}$$
$$\tau_1 = R78 C_1$$
$$\tau_2 = R31 C_3$$
$$\tau_3 = (R31 + R32) C_3$$
(15)

into Equations 13 and 14, where $s = j\omega$ and $\omega$ is radian frequency, the expression for $Z_0$ can be written as $$Z_0 = \frac{R1}{R2} \times \frac{R32(\tau_2 s + 1)}{(\tau_3 s + 1)} \times \frac{\tau_1 s}{(\tau_1 s + 1)} \quad (16)$$

At high frequencies wherein the products of $\tau$ and $S$ are much greater than one, the expression for $Z_0$ may be simplified to $$Z_0 = \frac{R1}{R2} \times \frac{R31 \, R32}{(R31 + R32)} \quad (17)$$

which has a similar form to that given previously for $Z_0$ upon use of the impedance element 64. The values of R31 and R32 are to be selected to produce the previous value of $Z_0 = 250$ ohms. The poles and zeroes of Equation 16 are to be separated, preferably, by letting $$\begin{aligned}\tau_3 &= 3\tau_2 \\ \tau_1 &= 3\tau_3\end{aligned} \quad (18)$$

which leads to value of R31 = 150 kilohms and R32 = 300 kilohms, where R1 and R2 retain their aforementioned values, respectively, of 50 ohms and 250 kilohms.

At zero frequency, the power amplifier with either the impedance element 64 or 64A functions essentially as an ideal voltage source with zero output impedance. At nonzero frequencies, the frequency dependency of the output impedance $Z_0$ peaks at relatively low frequencies, to a value of 750 ohms, and then levels off at higher frequencies to the aforementioned value of 250 ohms as is depicted in graph 74 of FIG. 3B. The graph 74 is a piecewise linear approximation having breakpoints at 16 hertz, 50 hertz, and 147 hertz. Therefore, in the audio frequency band of interest for voice communication, approximately 300-3300 hertz, the impedance has the desired magnitude.

With respect to matching the capacitance of the two-wire channel 22, it is desired to synthesize a capacitance of 4.32 microfarads in series with 450 ohms (the output resistance of 250 ohms plus the 200 ohms of the resistor 35). This is accomplished with the foregoing expressions for the output impedance $Z_0$ by setting C1 and C3 equal respectively to 31.0 and 7.2 nanofarads.

In view of the foregoing circuitry, the invention has provided a matching of the capacitive and resistive portions of the impedance of the two-wire channel 22. Both of the power amplifiers 31-32 attain the requisite impedance match over the audio frequency band while serving as a voltage source for providing DC excitation to the two-wire channel 22. Use of the impedance element 64 provides a match for the resistive component of the impedance, while use of the alternative impedance element 64A provides for a matching of both the resistive and the capacitive components of the impedance. In addition, the transistorized biasing circuits and the feedback configuration provide for substantial rejection of any noise which may be present on the power lines.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. An interface circuit for coupling two-wire and four-wire communication channels comprising:
    a first and a second power amplifying means for coupling data signals from an incoming section of said four-wire channel to first and second wires respectively of said two-wire channel, each of said power amplifying means having an input terminal;
    means for directing data signals from said two-wire channel to an outgoing section of said four-wire channel;
    means connected between the input terminals of said first and said second power amplifying means and an output terminal of said directing means for inhibiting the coupling of a signal from said incoming section to said outgoing section of said four-wire channel, said first and said second power amplifying means being operative with an external source of electric power for applying a predetermined DC voltage to respective ones of said wires of said two-wire channel, each of said power amplifying means comprising:
      an operational amplifying means for regulating DC voltage;
      a DC feedback path connected between a first input terminal and an output terminal of said operational amplifying means,
    a second input terminal of said operational amplifying means connecting with the input terminal of the power amplifying means; and
    a biasing circuit coupled to said first input terminal of said operational amplifying means, said biasing circuit comprising a complementary semiconductor circuit having a plurality of semiconductor elements for rejection of noise of said power supply from said output terminal, a first terminal of each of said semiconductor elements being connected to said first input terminal of said operational amplifying means; and
    a set of voltage divider circuits coupled to respective ones of said semiconductor elements and applying bias current thereto, each of said semiconductor elements having a second terminal for connection with a voltage divider circuit of said set of voltage divider circuits, said bias curents establishing the operating points of said semiconductor elements; and wherein
    said interface circuit further comprises means for serially connecting said biasing circuit and said set of voltage divider circuits of said first power amplifying means and said biasing circuit and said set of voltage divider circuits of said second power amplifying means between terminals of said source of power.

2. An interface circuit according to claim 1 wherein each of said power amplifying means further comprises an AC feedback path in parallel with said DC feedback path, said AC feedback path including a capacitor and a resistor connected together in series for matching a reactive component of the output impedance of said each amplifying means to a reactive component of the impedance of said two-wire channel.

3. An interface circuit for coupling two-wire and four-wire communication channels comprising:

a first and a second power amplifying means for coupling data signals from an incoming section of said four-wire channel to first and second wires respectively of said two-wire channel, each of said power amplifying means having an input terminal;

means for directing data signals from said two-wire channel to an outgoing section of said four-wire channel;

means connected between the input terminals of said first and said second power amplifying means and an output terminal of said directing means for inhibiting the coupling of a signal from said incoming section to said outgoing section of said four-wire channel, said first and said second power amplifying means being operative with an external source of electric power for applying a predetermined DC voltage to respective ones of said wires of said two-wire channel, each of said power amplifying means comprising:

an operational amplifying means for regulating DC voltage;

a DC feedback path connected between a first input terminal and an output terminal of said operational amplifying means, a second input terminal of said operational amplifying means connecting with the input terminal of the power amplifying means; and a biasing circuit coupled to said first input terminal of said operational amplifying means, said biasing circuit comprising a complementary semiconductor circuit having a plurality of semiconductor elements for rejection of noise of said power supply from said output terminal, a first terminal of each of said semiconductor elements being connected to said first input terminal of said operational amplifying means; and a set of voltage divider circuits coupled to respective ones of said semiconductor elements and applying bias current thereto, each of said semiconductor elements having a second terminal for connection with a voltage divider circuit of said set of voltage divider circuits, said bias curents establishing the operating points of said semiconductor elements; and wherein said interface circuit further comprises means for serially connecting said biasing circuit and said set of voltage divider circuits of said first power amplifying means with said biasing circuit and said set of voltage divider circuits of said second power amplifying means between terminals of said source of power; and wherein, in each of said power amplifying means, said semiconductor elements are arranged with complementary symmetry relative to said first input terminal of said operational amplifying means.

4. An interface circuit according to claim 3 wherein each of said semiconductor elements is a transistor, said first and said second terminals of each of said semiconductor elements being respectively a collector terminal and a base terminal.

5. An interface circuit according to claim 4 wherein one of said transistors is type N-P-N, and another of said transistors is type P-N-P.

6. An interface circuit according to claim 5 wherein each of said power amplifying means further comprises an AC feedback path in parallel with said DC feedback path, said AC feedback path including a capacitor and a resistor connected together in series for matching a reactive component of the output impedance of said each power amplifying means to a reactive component of the impedance of said two-wire channel.

7. An interface circuit according to claim 1 wherein each of said power amplifying means includes an output stage having a pair of output transistors connected together to said output terminal of said operational amplifying means with complementary symmetry.

8. An interface circuit according to claim 7 wherein said output transistors are connected via their emitter terminals to said output terminal of said operational amplifying means.

9. An interface circuit for coupling two-wire and four-wire communication channels comprising:

a first and a second power amplifying means for coupling data signals from an incoming section of said four-wire channel to first and second wires respectively of said two-wire channel, each of said power amplifying means having an input terminal;

means for directing data signals from said two-wire channel to an outgoing section of said four-wire channel;

means connected between the input terminals of said first and said second power amplifying means and an output terminal of said directing means for inhibiting the coupling of a signal from said incoming section to said outgoing section of said four-wire channel, said first and said second power amplifying means being operative with an external source of electric power for applying a predetermined DC voltage to respective ones of said wires of said two-wire channel, each of said power amplifying means comprising:

an operational amplifying means for regulating DC voltage;

a DC feedback path connected between a first input terminal and an output terminal of said operational amplifying means, a second input terminal of said operational amplifying means connecting with the input terminal of the power amplifying means; and a biasing circuit coupled to said first input terminal of said operational amplifying means, said biasing circuit comprising a complementary semiconductor circuit having a plurality of semiconductor elements for rejection of noise of said power supply from said output terminal, a first terminal of each of said semiconductor elements being connected to said first input terminal of said operational amplifying means; and a set of voltage divider circuits coupled to respective ones of said semiconductor elements and applying bias current thereto, each of said semiconductor elements having a second terminal for connection with a voltage divider circuit of said set of voltage divider circuits, said bias currents establishing the operating points of said semiconductor elements; and wherein said interface circuit further comprises means for serially connecting said biasing circuit and said set of voltage divider circuits of said first power amplifying means with said biasing circuit and said set of voltage divider circuits of said second power amplifying means between terminals of said source of power; each of said power amplifying means includes an output stage having a pair of output transistors connected together to said output terminal of said operational amplifying means with complementary symmetry, said output transistors being connected via their emitter terminals to said output terminal of said operational amplifying means; and wherein each of said power amplifying means further comprises a capacitor feedback branch coupled between a collector terminal of one of said output transistors and said second terminal of one of said semiconductor elements of said biasing circuit, said second terminal being a control terminal, thereby to provide an output impedance to said power amplifying means having one value at DC and a second value in a frequency band of said data signals.

10. An interface circuit according to claim 9 wherein each of said power amplifying means further comprises an AC feedback path in parallel with said DC feedback path, said AC feedback path including a capacitor and a resistor connected together in series for matching a reactive component of the output capacitance of said each power amplifying means to a reactive component of the impedance of said two-wire channel.

11. An interface circuit according to claim 9 wherein said biasing circuit in each of said power amplifying means comprises two of said semiconductor elements, each of said semiconductor elements being a transistor having emitter, base, and collector terminals, said first and said second terminals of each of said semiconductor elements being respectively a collector terminal and a base terminal.

12. An interface circuit according to claim 11 wherein each of said power amplifying means further comprises an AC feedback path in parallel with said DC feedback path, said AC feedback path including a capacitor and a resistor connected together in series for matching a reactive component of the output impedance of said each power amplifying means to a reactive component of the impedance of said two-wire channel.

13. An interface circuit according to claim 12 further comprising first and second feed resistors connecting said output terminals, respectively, of said first power amplifying means and said second power amplifying means with said first wire and said second wire of said two-wire channel.

14. In a subscriber line interface circuit for coupling a two-wire transmission line and a four-wire communication channel in a telephone system, there being means for inhibiting the coupling of data signals between incoming and outgoing sections of said four-wire channel and, in which interface circuit a pair of power amplifiers apply power from a source of power to the wires of said transmission line, and wherein each of said power amplifiers includes operational amplifier means for regulating a flow of power to said transmission line, an improvement disposed in each of said power amplifiers comprising:

a DC feedback path connected between a first input terminal and an output terminal of said operational amplifier means, a second input terminal of said operational amplifier means connecting with said incoming section of said channel;

a biasing circuit coupled to said first input terminal of said operational amplifier means, said biasing circuit comprising a complementary transistor circuit for rejection of noise of said power supply from said output terminal, said transistor circuit having two transistors coupled via respective transistor output terminals to said second input terminal of said operational amplifier means;

a set of voltage divider circuits coupled to respective ones of said transistors and applying bias current to base terminals of respective ones of said transistors, said bias currents establishing the operating points of said transistors; and wherein said transistors are arranged with complimentary symmetry relative to said first input terminal; and wherein said biasing circuit and the set of voltage divider circuits of one said power amplifiers, and said biasing circuit and the set of voltage divider circuits of a second of said power amplifiers are serially connected between terminals of said power source.

15. In an interface circuit, an improvement according to claim 14 further comprising, in each of said power amplifiers, an AC feedback path in parallel with said DC feedback path, said AC feedback path including a capacitor and a resistor connected together in series for matching a reactive component of the output impedance of each of said power amplifiers to a reactive component of the impedance of said transmission line.

16. In an interface circuit, an improvement according to claim 14 wherein said output terminals of said transistors are collector terminals, and wherein one of said transistors is type N-P-N and the other of said transistors is type P-N-P.

17. In an interface circuit, an improvement according to claim 14 wherein each of said power amplifiers includes an output stage having a pair of output transistors connected together via their respective emitter terminals to said output terminal of said operational amplifier means with complementary symmetry; said improvement further comprising a capacitive feedback branch coupled between a collector terminal of one of said output transistors and the base terminal of one of said transistors of said biasing circuit, thereby to provide an output impedance to each of said power amplifiers having one value at DC and a second value in a frequency band reserved for the transmission of voice and data via said telephone system.

* * * * *